(12) United States Patent
Fayolle et al.

(10) Patent No.: US 11,338,230 B2
(45) Date of Patent: May 24, 2022

(54) FUEL FILTER AND MOUNTING SUPPORT OF WHICH THE OUTLET IS SEALED BY A VALVE IN CASE OF REMOVAL OF A FILTER INSERT

(71) Applicant: SOGEFI FILTRATION, Guyancourt (FR)

(72) Inventors: Laurent Fayolle, Nanterre (FR); Xavier Lalleman, Ivry sur Seine (FR)

(73) Assignee: SOGEFI FILTRATION, Guyancourt (FR)

( * ) Notice: Subject to any disclaimer, the term of this patent is extended or adjusted under 35 U.S.C. 154(b) by 680 days.

(21) Appl. No.: 16/073,550

(22) PCT Filed: Jan. 25, 2017

(86) PCT No.: PCT/FR2017/050159
§ 371 (c)(1),
(2) Date: Jul. 27, 2018

(87) PCT Pub. No.: WO2017/129896
PCT Pub. Date: Aug. 3, 2017

(65) Prior Publication Data
US 2019/0030471 A1    Jan. 31, 2019

(30) Foreign Application Priority Data
Jan. 29, 2016  (FR) ..................................... 16 50723

(51) Int. Cl.
*B01D 35/157* (2006.01)
*B01D 36/00* (2006.01)
(Continued)

(52) U.S. Cl.
CPC ......... *B01D 35/1573* (2013.01); *B01D 29/15* (2013.01); *B01D 29/21* (2013.01);
(Continued)

(58) Field of Classification Search
USPC ........................................................ 210/234
See application file for complete search history.

(56) References Cited

U.S. PATENT DOCUMENTS 6,217,755 B1 * 4/2001 Stifelman ............ B01D 35/157
210/116
7,147,110 B2 * 12/2006 Clausen ................. B01D 29/21
210/436
(Continued)

FOREIGN PATENT DOCUMENTS

CN    200946542 Y    9/2007
DE    43 30 840 C1    2/1995
(Continued)

OTHER PUBLICATIONS

International Search Report, dated May 8, 2017, from corresponding PCT application No. PCT/FR2017/050159.

*Primary Examiner* — Hayden Brewster
(74) *Attorney, Agent, or Firm* — Nixon & Vanderhye (57) ABSTRACT

The fuel filter has an outlet for the filtered fuel in a lower base portion of a casing, and a valve associated with the outlet. The filter insert has an internal space in which filtered fuel flows and that accommodates a central member capable of moving the valve to an open position when the insert is in an operational configuration in the casing. The valve is urged, by default, to a sealed position cutting off the flow to the outlet, for example by resilient return arranged between the bottom of the filter and a wall of an interface that guides the lower end of the central member. The central member and the filter insert form a removable unit, and it is therefore possible, typically by way of a cover/removable unit fastening, to automatically obtain the sealed position after opening the top cover.

19 Claims, 5 Drawing Sheets

(51) Int. Cl.
  *B01D 35/153* (2006.01)
  *B01D 29/15* (2006.01)
  *B01D 35/16* (2006.01)
  *B01D 29/21* (2006.01)
  *B01D 35/00* (2006.01)

(52) U.S. Cl.
  CPC ......... *B01D 35/005* (2013.01); *B01D 35/153* (2013.01); *B01D 35/1576* (2013.01); *B01D 35/16* (2013.01); *B01D 36/001* (2013.01); *B01D 2201/16* (2013.01); *B01D 2201/291* (2013.01); *B01D 2201/305* (2013.01); *B01D 2201/316* (2013.01); *B01D 2201/347* (2013.01)

(56) References Cited

U.S. PATENT DOCUMENTS

| | | |
|---|---|---|
| 2005/0072396 A1 | 4/2005 | Lee |
| 2009/0114589 A1* | 5/2009 | Reiland ............... B01D 29/232 210/472 |
| 2009/0139920 A1* | 6/2009 | Dhawale ............. B01D 35/147 210/123 |
| 2010/0213115 A1 | 8/2010 | Thomas et al. |
| 2013/0270162 A1* | 10/2013 | Ardes ................... B01D 29/21 210/130 |
| 2016/0222931 A1 | 8/2016 | Jiang et al. |

FOREIGN PATENT DOCUMENTS

| | | |
|---|---|---|
| DE | 195 19 352 A1 | 11/1996 |
| DE | 10 2013 008 987 A1 | 12/2014 |
| EP | 2067514 A2 | 6/2009 |
| WO | 2015/042348 A1 | 3/2015 |

\* cited by examiner

FUEL FILTER AND MOUNTING SUPPORT OF WHICH THE OUTLET IS SEALED BY A VALVE IN CASE OF REMOVAL OF A FILTER INSERT

TECHNICAL FIELD OF THE INVENTION

The present invention relates to fuel filters for internal combustion engines, particularly to diesel filters having a filter insert that is removable from a filter housing.

BACKGROUND OF THE INVENTION

A fuel filter of the above type typically comprises a fuel inlet and outlet defined by the housing, and a filter insert housed inside the housing so as to define an upstream region of unfiltered fuel which communicates with the inlet and a downstream region of filtered fuel which communicates with the outlet. In a diesel fuel supply system for a diesel engine, this type of filter allows filtering the diesel fuel to eliminate impurities and optionally to separate out water in suspension. In a motor vehicle, the fuel supply system comprises a fuel filter, an injection pump, and a fuel circulation pump (or priming pump) which can be placed upstream of the filter (then referred to as a "booster pump"), the filter then operating under positive pressure, or downstream of the filter, the filter then operating under negative pressure.

This type of filter may have a functional member, such as a piping member forming part of the venting means for the gases contained in the fuel, a heating member (where appropriate in the form of a circulation member for hot liquid) or a rod for closing a liquid discharge channel. Often, this type of functional member is placed across the filter insert which is removable, whether or not the functional member is reusable. The functional member then generally has a central position.

When using a filter under negative pressure, the negative pressure due to suction of the fuel causes cavitation. The air contained in the fuel separates from the liquid and an air pocket is created in the filter, which must be vented. Providing a piping member or similar central member is thus of interest when gases need to be directed toward an outlet positioned in the lower side of the housing.

Various degassing means are employed in the prior art which use a central functional member, among which two families can be distinguished:
 a first family, grouping degassing means arranged in the "clean side", meaning in an region downstream of the filter medium;
 a second family, grouping degassing means arranged in the "dirty side" meaning in a region upstream of the filter medium.

Of course, a fuel filter provided with degassing means cannot be confused with an oil filter as described in document US 2005/0072396.

In the first family, a filter of the above type is known from patent DE 4330840 C1 which uses a small venting port to prevent air accumulation at a high point of the filter (including upstream of the filter medium). The presence of a small port prevents large air bubbles from entering the pump, which would result in its stalling.

Document DE 4330840 C1 discloses fuel filters and filter inserts having a first flange (upper), a second flange (lower), and a cylindrical paper filter insert which is supported between the first flange and the second flange and which surrounds a pipe which conveys the gas (typically air) to an escape passage formed in a base of the filter. The pipe is mounted so as to be integral with the base and captures the gas via a calibrated port defined under the first flange, at the top of the region downstream of the filter medium.

In the second family, a filter of the above type is known from document DE 19519352 or document DE 102013008987 which uses a small venting port located in an upper end of a tube which sealingly engages through a central opening of the first flange (upper). The tube thus forms a bypass for the lighter-than-fuel gas which is able to pass through the calibrated port: the gas present in the region upstream of the filter can therefore be vented without needing to travel radially through the filter medium.

With this kind of filter, the gas venting system is highly reliable because the tube can be replaced at the same time as the filter insert. One can thus minimize the risk of clogging the port which has a narrow flow area (typically a diameter of a few tenths of a millimeter).

In the following, the term "gas venting port" is to be understood in the present context as a port having a narrow flow area and therefore calibrated to avoid generating overly large gas bubbles (their size remaining less than or equal to a few millimeters for example, preferably not exceeding 2 or 3 mm). This is already known per se and is clearly understood in the field of filtering a liquid such as fuel.

The filter insert disclosed in document DE 19519352 requires an additional seal to connect the tube to the first flange and does not contribute to improving the step of replacing the filter insert. Moreover, a disadvantage of this type of filter insert is that it directly frees the clean fuel outlet pipe when it is removed. This can cause contamination of the outlet pipe by unfiltered fuel during a filter insert replacement operation.

More generally, for fuel filters whose housing is reusable, there is a need to improve the conditions for replacement of the filter inserts housed in a housing in which the fuel outlet is located at the bottom.

GENERAL DESCRIPTION OF INVENTION

The present invention aims to provide a fuel filter of the type having a fuel outlet on the side opposite to the top cover, and in which the filter insert replacement operation is carried out with better guidance of the residual fuel present within the inside volume.

To this end, the invention proposes a receptacle comprising a base portion forming a bottom and a cover detachably connected to the base portion, the receptacle being provided with an inlet for unfiltered fuel and an outlet for filtered fuel which is located in the base portion, an inside volume being defined between the base portion and the cover,
 a filter insert arranged in the inside volume and having an upper axial end including or defined by a first flange engaged (directly or indirectly) against the cover, a lower axial end, and a substantially annular filter medium extending about a longitudinal axis between the upper axial end and the lower axial end, the filter medium having an inner face which defines a hollow internal space in communication with the outlet (this is obviously a communication that is sealed with respect to the region upstream of the filtration, so that the only possible circulation between the upstream region and the downstream region passes through the filter medium),
 a central member extending in the hollow internal space and having a first end directly integral or adjacent to the first flange and a second end opposite to the first end, a transverse wall extending beneath at least one among the lower axial end and the central member, defining a passageway between the hollow internal space and the outlet, with the characteristic that the filter further comprises a valve for selectively opening the passageway in an operative configuration of the filter insert under the effect of an engagement between the central actuating member and said valve which is mounted so as to move relative to the transverse wall, the second end of the actuating member being provided for moving the valve, the valve by default being biased to a position which closes the passageway.

With these arrangements, the actuating member moves the valve according to the position of the filter insert: the closed position can then be obtained by removing the cover with the associated removal of the filter insert. The unfiltered fuel then cannot drain towards the outlet and thus, by integrating an actuating member into the central part of the filter, the risk of contamination of the outlet by unfiltered fuel is minimized or eliminated.

In addition, the transverse wall defines a passage for conveying gases contained in the fuel to an escape channel that is distinct from the inlet and the outlet. The conditions for replacing the filter insert are thus improved, while enabling an efficient venting of the gases contained in the fuel.

According to one feature, the actuating member extends parallel to the longitudinal axis and is adapted for circulating a fluid that is distinct from the fuel and/or a fuel that is warmer than the unfiltered fuel. The central member thus has at least one specific function (operative member) in addition to the function of actuating the valve.

Alternatively, the actuating member may be electrically powered via a pair of electric poles formed in a lower end (which where appropriate may pass through a lower flange of the filter insert). These poles are electrically connected to two corresponding terminals provided in the base portion and connected to an electrical connector of a type known per se. The contacts of the two terminals are each formed for example by the end of a resilient return member of electrically conductive material. Guidance for the filter insert by a guide member (positioning system provided on a side wall of the housing/receptacle) may optionally be provided to ensure correct orientation for the electrical connection of the actuating member to the two terminals.

A heating function to prevent the risk of clogging may be provided at the core of the filter and/or in a portion close to or projecting from the upper flange, using heating plates or pellets (PTC type heating element). The actuating member extends longitudinally and can be used as a mounting support for an assembly which includes the conduction lines or strips to the heating element or elements. One can for example define a sleeve F or similar structure whose side wall enables attaching, and typically overmolding, the conduction lines or strips.

According to one option, the circulation of fluid to heat the hollow internal space may be achieved by a piping member, which can be respectively connected to two ports provided on the cover. This piping member can then pass through the first flange and form an actuating member for the valve. In this case, the piping member also has first and second ends respectively for engaging the first flange and for engaging the valve.

According to one feature, the second end of the actuating member comprises a first contact portion, which preferably forms a male portion for insertion into a defined pipe of a connection interface including the transverse wall. The second end of the actuating member further has a second contact portion, preferably offset longitudinally relative to the first contact portion and forming radial projections, a collar or a shoulder, which comes into axial abutment against the valve and enables pushing it downward.

According to one feature, the valve has an upper sealing face located lower than at least one engagement surface in engagement with the actuating member and arranged at the periphery of the defined pipe.

In various embodiments of the filter according to the invention, one or more of the following arrangements may possibly be further employed:

the filter provides a water separation function.

the water is separated from the fuel within the inside volume, preferably using a water separator element or a coalescence function (this separation function is typically performed by a member embedded in or integral with the filter insert).

discharge means for unfiltered fuel are provided opposite to the cover; such discharge means may correspond to a unfiltered fuel drain outlet located in the bottom, automatically made accessible by a closure member biased by the filter insert.

the closure member is movably mounted in the base portion so as to selectively close a connecting channel between the inside volume and the discharge means, in a position where the lower axial end of the filter insert bears against the closure member.

the valve extends inside a defined internal region located between the bottom and the transverse wall, the valve being movable parallel to the longitudinal axis between a raised position corresponding to the closed position and a lowered position where the passageway communicates with the outlet via the defined internal region, the second end of the actuating member being adapted to urge the valve.

the base portion comprises a bowl including the inlet and outlet, and an annular wall (preferably integrally formed as one piece with the bowl) which extends upwardly from the bottom and defines a sealed annular contact with a second flange of generally annular shape defining the lower axial end of the filter insert, the annular wall defining an outer circumference of the defined internal region.

a resilient return member which biases the valve towards the closed position is accommodated in the defined internal region, preferably at a distance from the annular wall.

the actuating member extends parallel to the longitudinal axis and is part of a venting path for gases contained in the fuel, the venting path comprising at least one port of small cross-section located above or at the upper end of the hollow internal space; thus there is provided in the hollow internal space and in the base portion. In a compact manner, a gas venting function in addition to the automatic opening (when installing the filter insert) for access to the outlet for filtered fuel.

the gas venting path is configured either to capture the gas in the region upstream of the filter or to capture the gas in the region downstream.

the base portion supports a connection interface including the transverse wall and sealingly connected to the annular wall, the connection interface forming a sealing continuity between the annular wall and the second flange, so that a region upstream of the filtration that communicates with the inlet is separated from a region downstream of the filtration that communicates with the outlet, the annular wall surrounding all or part of a pipe defined by the connection interface, the defined pipe forming part of the venting path.

the connection interface comprises a portion sealingly engaged against the annular wall by an annular and preferably radial contact, and a sleeve extending into the hollow internal space (reaching or exceeding half the height of the filter insert in the mounted position) and of which the bottom defines the passageway; thus the sleeve forms a barrier preventing the unfiltered fuel present around the filter medium from flowing under the filter insert towards the passageway, which is important during the short time where the filter insert is no longer in contact with the connection interface but the valve has not yet reached the closed position.

the actuating member is defined by a piping member extending within the hollow internal space and in communication with an escape channel for gases, the escape channel being distinct from the outlet and formed in the base portion.

the port of small cross-section is defined by the first flange and communicates with the interior of the piping member.

the valve has an upper sealing face, preferably substantially flat, and at least one projection protruding longitudinally upwards from the upper sealing face, such that the upper sealing face and an engaging face of the projection are respectively located above and below a seat defined by the transverse wall.

the second end of the actuating member comprises a free end adapted to sealingly engage with a tubular coupling formed in the transverse wall, and at least one stop member, preferably a collar, for axially engaging the longitudinal projection while pushing the valve and also for engaging the coupling; the actuating member thus has a robust configuration, being protected within the hollow internal space and being rigidly attached to a connection interface (with a radial contact combined with an axial contact against the interface, stresses on the actuating member are minimized, which is advantageous in an environment subject to vibrations when the vehicle is in motion).

the valve has a lower face abutting against a portion that projects relative to the bottom and a tubular sliding member mounted around a longitudinal guide of the base portion, the sliding member extending downwardly from the lower face of the valve.

The invention also relates to a mounting support for a fuel filter including the inlet and the outlet in the lower base side and defining an improved connection interface for a filter insert.

To this end, a mounting support for forming the lower end of the fuel filter according to the invention is proposed, the mounting support comprising:

a base portion forming a bottom having an outer boundary, and provided with an annular wall extending about a longitudinal axis (at a distance from the outer boundary in a preferred option) to an upper annular edge, an inlet for unfiltered fuel and an outlet for filtered fuel which is located on the inner side of the annular wall (the inlet being located in a different area, for example the outer side of the annular wall if it is close to the bottom or located in the bottom), a transverse wall which extends higher than the upper annular edge and covers an internal region defined by the annular wall, forming a passageway that defines a single access to the outlet, a valve mounted so as to be movable relative to the transverse wall and biased by default by resilient return means towards a raised position which closes the passageway, the valve being actuated by pushing from above, so that access to the outlet is selectively enabled when the valve is in a lowered position, the base portion further comprising an escape channel for gases contained in the fuel, distinct from the inlet and outlet and extending through the defined internal region.

The mounting support thus combines many functions, including the venting of gases contained in the fuel. The support advantageously defines an internal region for filtered fuel due to the annular wall, while closing access to this internal region automatically/by default when the valve is not engaged by an axial support which is central (in particular with respect to the eccentric position of the fuel inlet).

According to one feature, the transverse wall is part of a connection interface comprising:

a longitudinal sleeve extending from an upper face of the transverse wall;

an upper pipe segment surrounded by the sleeve and coaxial with the sleeve; and a lower pipe segment which the upper segment opens into, which protrudes in a direction opposite to the sleeve, the lower segment and the passageway being separated from each other by a diverting portion adapted to divert a stream of gas from the upper segment to the lower segment.

The invention also relates to the use of a piping member in the filter insert in order to enable, in the mounted configuration for filtration, circulation suitable for different fluids (unfiltered fuel, gases, filtered fuel) with no risk of contaminating the filtered fuel outlet during a replacement operation.

To this end, the use of a piping member in a filter insert is proposed (insert removable from the corresponding filter housing) of the type provided with a filter medium of annular shape extending between a first flange and a second flange and adapted for fuel filtration, wherein the piping member and the filter insert are operative in a state assembled in a filter comprising the mounting support of the invention, the piping member engaging by a first end with the first flange while extending into a hollow internal space defined by the filter medium, a second end of the piping member enabling movement of the valve of the mounting support to an open position while leading towards the escape channel (the piping member thereby defining a member for actuating the valve), one among the piping member and the first flange having a port whose cross-section is adapted for selectively circulating the gas through the piping member.

Thus, a new function for a filter insert is added, with the added possibility for the lower axial end of the filter insert to act as actuator for a closure member, typically in order to close a purge channel for unfiltered fuel. Positioning of the filter insert associated with the piping member is permitted where appropriate without the need for any rotational indexing, which is advantageous for the operator (time is saved in installing the removable unit defined by the filter insert and piping member). The use of a sleeve in the coupling interface of the mounting support is an option which further facilitates the correct centered position of the piping member.

BRIEF DESCRIPTION OF DRAWINGS

Other features and advantages of the invention are apparent from the following description of several embodiments, given as non-limiting examples, with reference to the accompanying drawings in which.

DESCRIPTION OF PREFERRED EMBODIMENTS OF THE INVENTION

In the various figures, identical references indicate identical or similar elements.

Figure 1:
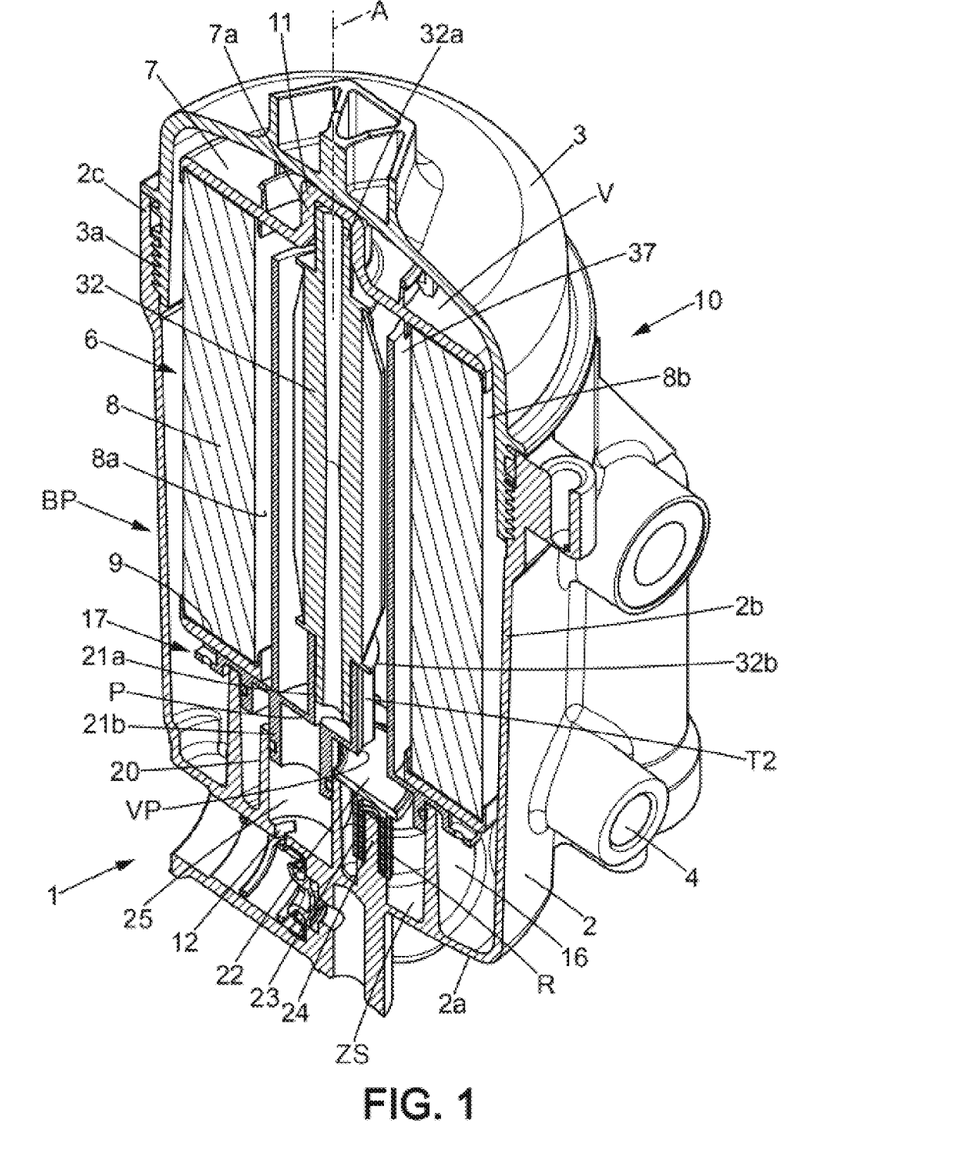
FIG. 1 shows a perspective and longitudinal section view of the arrangement according to the invention of the filter insert and the actuating member in the filter housing, in a lowered position of the sealing valve.
Figure 4:
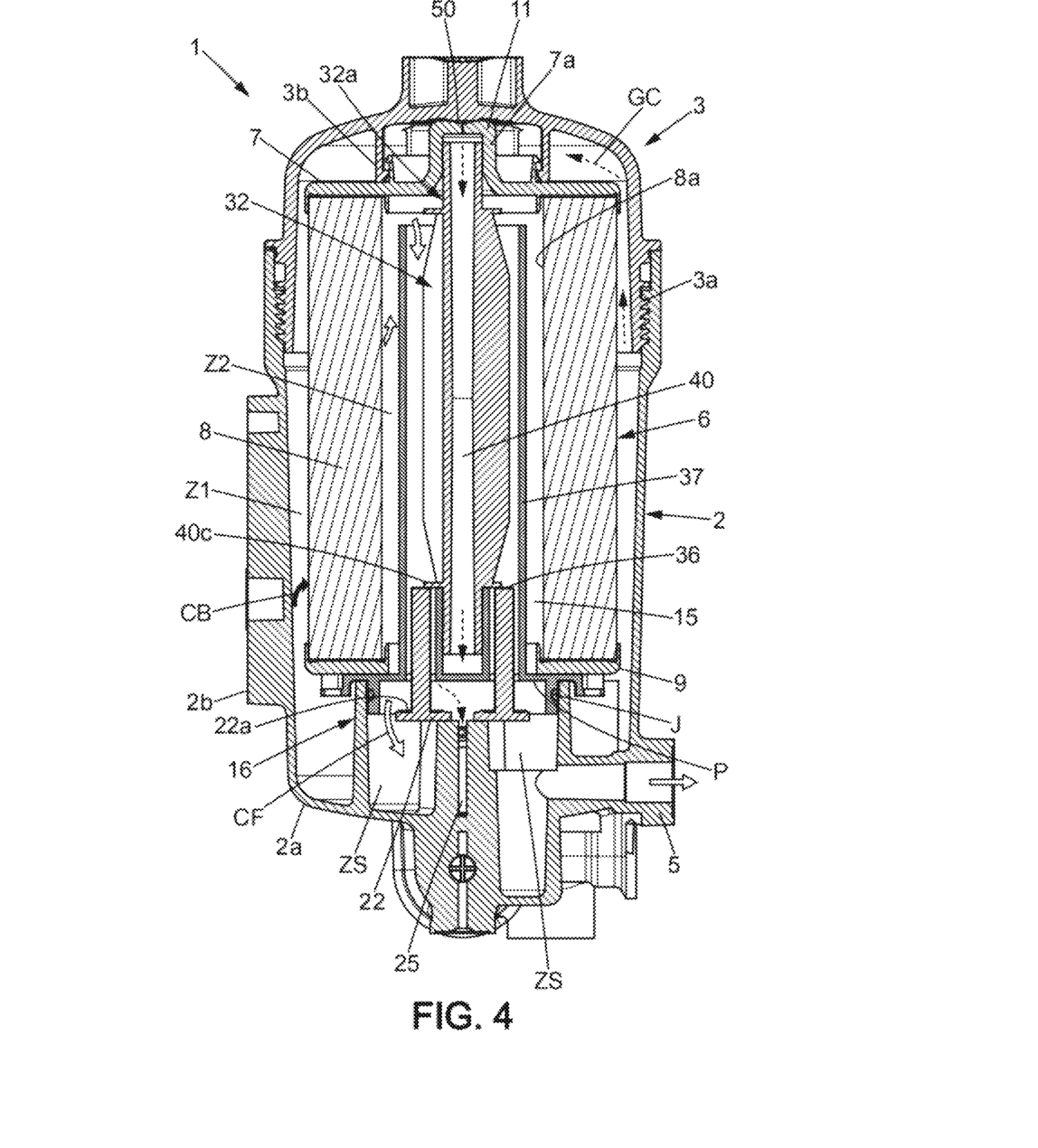
FIG. 4 is a sectional view of a fuel filter with the valve in the same lowered position as illustrated in FIG. 1.

FIGS. 1 and 4 represent an embodiment of the fuel filter 1 (for diesel or similar fuel) which has venting means for the gases contained in the fuel which extend between a gas capturing upper end 11 and a gas venting lower end 12. This filter 1 comprises a receptacle 10 in the form of a housing which is for example in two parts. The receptacle 10 has a bottom wall and a top wall (here formed by a cover 3 or similar closing wall). In the non-limiting example of the figures, the bottom wall is formed by a bowl 2 typically made of metal or plastic. The bowl 2 has a base 2a from which a side wall 2b extends upwardly, here substantially cylindrical and having an upper end portion 2c directly integral to the cover 3. The cover 3, forming the upper wall of the housing, is directly attached to the bowl 2. More generally, it is understood that the cover 3 is sealingly connected to the bowl 2.

The edge of the cover 3 may be for example screwed to the edge of the bowl 2, using a plurality of screws extending through holes and engaged in nuts, or by means of a peripheral thread 3a in a manner known per se. In alternative embodiments, an additional part may be used to form a portion or the entirety of the side wall 2b.

As illustrated in FIG. 1, the bottom wall here formed by the bowl 2 has an inlet 4 for fuel to be filtered and an outlet 5 for filtered fuel, enabling the circulation and filtration of fuel inside the filter 1. The housing is connectable in an interchangeable manner to lines of a fuel supply system of a combustion engine vehicle.

In this example, the bottom 2a of the bowl 2 is part of a base portion BP. An inside volume V of the filter 1 is here defined between the base portion BP and the cover 3, in order to accommodate a filter insert 6. The gas capturing upper end 11 may be defined at an upper axial end of the filter insert 6. A first flange 7 may form the upper axial end and is configured to engage, directly or possibly indirectly, against the cover 3. The filter insert 6 may have a generally annular shape and extends along a longitudinal axis A. The longitudinal axis A is preferably a central axis of revolution of the filter insert 6 and possibly also corresponds to a central axis of the venting means. The filter insert 6 has a filter medium 8, and a second flange 9 may form a lower axial end in contact with the base portion BP.

The filter medium 5 is held between the first flange 7 and the second flange 9. The filter medium 8 preferably extends around the longitudinal axis A which may possibly be coincident with the axis of revolution of the bowl 2 when the wall 2b is cylindrical. The hollow internal space 15 defined by the inner face 8a of the filter medium 8 communicates with the outlet 5 visible in FIG. 4, which allows the filtered fuel CF to flow within this space towards the outlet 5. Around the outer face 8b of the filter medium 8, unfiltered fuel CB flows from the inlet 4 visible in FIGS. 1 and 2. As the outer face 8b is more extensive than the inner face 8a, the centripetal direction of filtration is more efficient for the separation of impurities.

Of course, other embodiments of the filter insert 6 can be used, for example with only the first flange 7 or without any axial flange, a tubular reinforcing element possibly being provided in this case which is held in position by contact with the inner face 8a of the filter medium 8.

Figure 2:
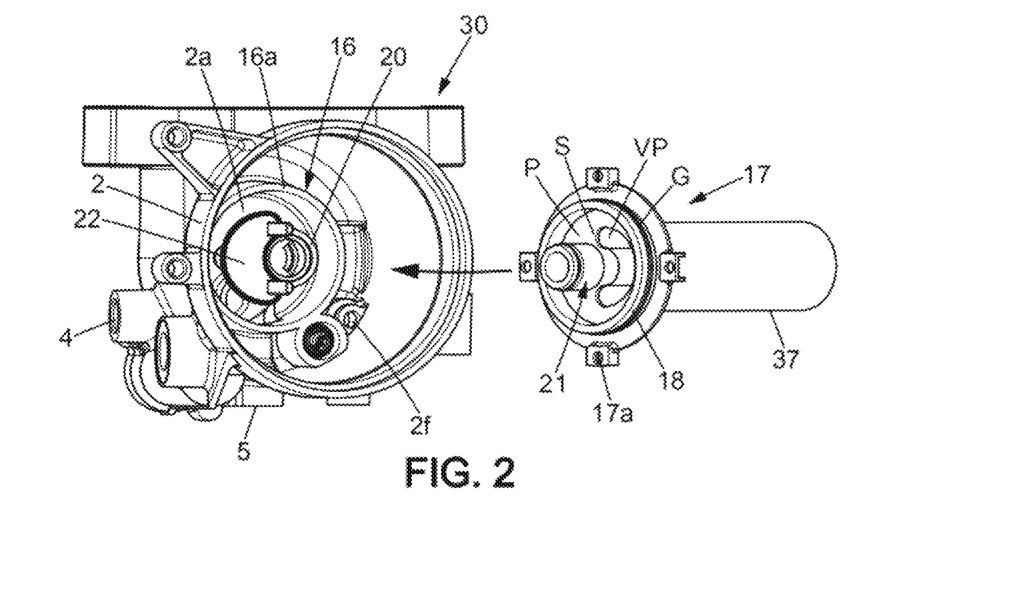
FIG. 2 shows a mode of assembly between a base portion and a connection interface, in order to define a mounting support for a fuel filter according to one embodiment of the invention.
Figure 3:
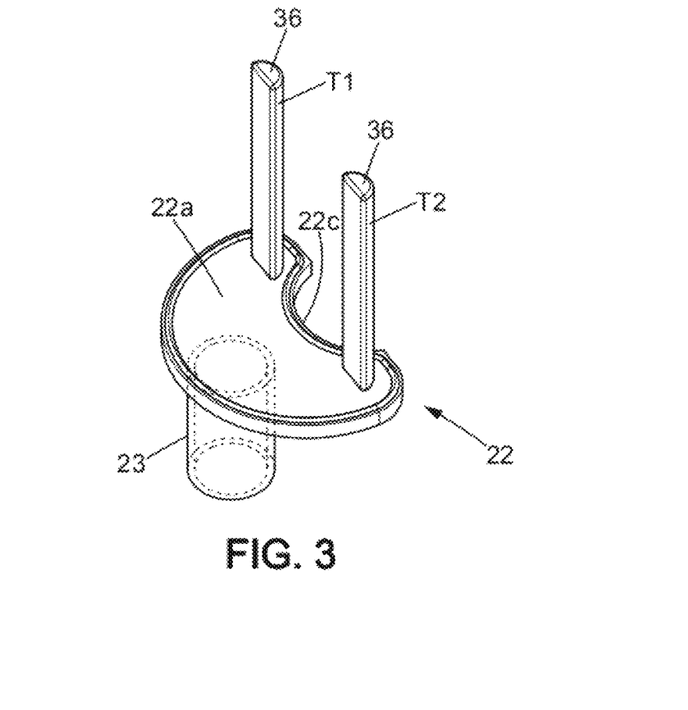
FIG. 3 is a perspective view of the sealing valve which is part of the support (bracket) illustrated in FIG. 2.

Referring to FIGS. 2, 3, and 4, the base portion BP is here defined externally by the side wall 2b which externally defines the bottom 2a. The base portion BP has an annular wall 16 extending parallel to the side wall 2b and at a distance from the outer boundary, around a longitudinal axis which may optionally be coincident with the longitudinal axis A of the filter medium 8. The upper annular edge 16a of the annular wall 16 here runs perpendicularly to the longitudinal axis A and forms an axial bearing surface for a connection interface 17. In addition, the inner face of this annular wall 16 is in sealing radial annular contact with a lower projection from the connection interface 17. This lower projection is defined here in the form of a skirt 18, which presents an annular sealing member J such as an O-ring (for example housed in a suitable groove G) for defining the annular sealing contact.

The skirt 18 is part of a transverse wall P which extends below the filter insert 6. As shown in FIG. 2, the transverse wall P may have flanges 17a or other elements for attaching the connection interface 17 to the base portion BP (here via one or more screws each passing through a flange 17a and engaging in a female portion 2f forming a thread, provided in the base portion BP).

Referring to FIGS. 1 and 2, the connection interface 17 also sealingly engages, preferably by a radial annular contact, against the inner face of a central pipe 20 which protrudes upwardly from the bottom 2a, parallel to the annular wall 16. In a preferred option, the central pipe 20 is not coaxial with the annular wall 16, which enables placement of a valve 22 on the inside of the annular wall 16.

Referring to FIGS. 1 and 3, this valve 22 has for example a tubular sliding member 23 mounted about a longitudinal guide 24 of the base portion BP at the same level of height as the central pipe 20. The valve 22 has a lower face which abuts, in a lowered position for opening the passageway VP, against a protruding portion of the base portion BP which protrudes from the bottom 2a. The tubular sliding member 23 extends downwardly from the lower face of the valve 22, being laterally offset relative to the area bearing against the protruding portion. As illustrated in FIG. 4, the central pipe 20 may define this protruding portion. Between the annular wall 16 and the central pipe 20, an internal region ZS is defined which opens to outside the receptacle 10 via the outlet 5.

It can be seen in FIGS. 1 and 4 that the defined internal region ZS extends for example between the bottom 2a and a transverse wall P defined by the connection interface 17. By engaging against the annular wall 16 from above, this transverse wall P allows sealingly separating the defined internal region ZS, provided for the circulation of filtered fuel CF, from the region Z1 upstream of filtration which extends peripherally around the filter insert 6. The unfiltered fuel CB arriving through the inlet 4 thus must pass through the filter medium 8 and cannot flow into the defined internal region ZS. Moreover, in the example shown, the transverse wall P defines two parallel flow paths, one for access of the filtered fuel CF into the defined internal region ZS from the internal space 15, the other for routing gases to an escape channel 25. This escape channel 25 may lead to the lower end 12.

The passageway VP is defined in the transverse wall P with a position that is inwardly offset relative to the skirt 18, as illustrated in FIG. 2, so that it allows connecting the hollow internal space 15 to the outlet 5. A defined pipe 21 intended for gases is formed by the connection interface 17 and is adapted for selective communication with the central pipe 20 without interfering with the flow of filtered fuel CF through the passageway VP.

FIG. 2 illustrates the assembly of the valve 22 in a mounting support 30 which forms the lower end of the fuel filter 1. The connection interface 17 is superimposed on the annular wall 16 and is connected to this wall 16 and to the central pipe 20, such that an upper sealing face 22a that is part of the valve 22 is in alignment with the passageway VP. The transverse wall P of the connection interface 17 can then define a seat S for the valve 22. The seat S corresponds here to a portion, adjacent to the passageway VP, which is formed in the lower face of the transverse wall P.

Figure 6A:
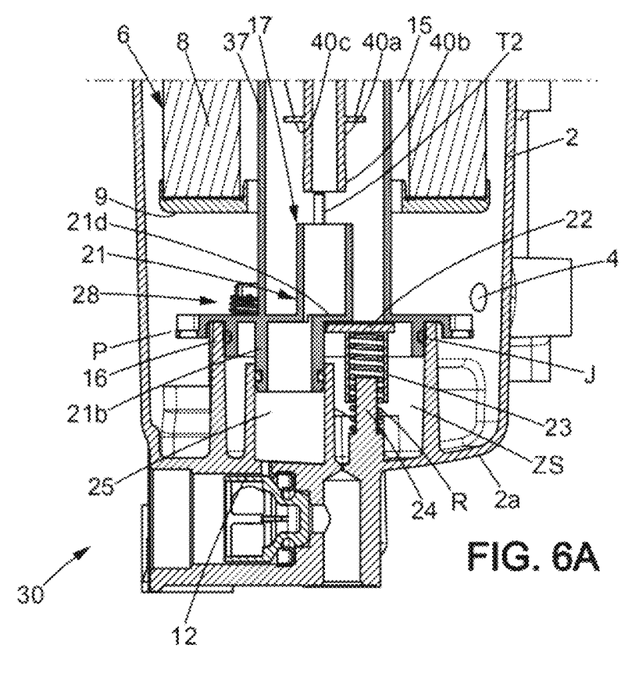
FIG. 6A is a detail view in longitudinal section, illustrating a raised position of the sealing valve which closes access to the filtered fuel outlet.

The valve 22 is mounted so as to be movable with respect to the transverse wall P and by default to be biased by resilient return means R, for example in the form of a spring, towards a raised position which closes the passageway VP (bearing against the seat S), as illustrated in FIG. 6A. In this case, the connection interface 17 and the valve 22 combine to sealingly cover the defined internal region ZS and the fuel can no longer flow to the outlet 5.

As can be seen in FIG. 6A, the resilient return means R may be housed in the defined internal region ZS, preferably at a distance from the annular wall 16. A coil spring may be used, mounted around the longitudinal guide 24 and with its lower end bearing on a fixed shoulder formed in the base portion BP. This compression spring is internally housed in the tubular sliding member 23 and, at its upper end, it can push (directly or indirectly) the closure portion of the valve 22 toward the seat S defined by the transverse wall P.

During the sealing of the access to the defined internal region ZS, which can correspond to the moment when the filter insert 6 is removed, a purge channel 29 is preferably provided which is only open when the fuel filter 1 is no longer in operation.

Figure 6B:
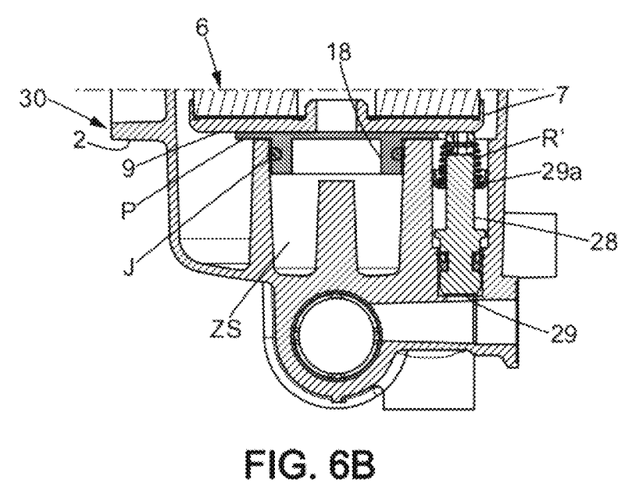
FIG. 6B is a detailed view in a vertical section parallel to the longitudinal axis, illustrating an operative position of the filter insert which allows closing a purge port.

FIG. 6B illustrates the use of a closure member 28 which by default is biased toward a raised position by a coil spring R' or other similar resilient return member. In a position where the lower axial end of the filter insert 6 bears against the closure member 28, the spring R' is in a compressed state bearing against a lower axial annular abutment surface 29a which is fixed with respect to the base portion BP.

This configuration allows automatically opening the purge channel 29 by removing the filter insert 6 (which is used to push the closure member 28 towards a position which closes the purge channel 29). Indeed, the moment the bearing pressure ceases, the spring R' pulls back from the upper side, bringing the closure member 28 with it.

Referring to FIGS. 2 and 6A, the connection interface 17 may advantageously have a sleeve 37 which extends perpendicularly to the transverse wall P. This sleeve 37 is formed here as integral with the transverse wall P and also (preferably) with the defined pipe 21. The passageway VP and the defined pipe 21 each open at the top to the sleeve 37.

Thus, in the raised position of the closure member 28 which is obtained by lifting the filter insert 6, it is understood that the fuel escapes by gravity into the purge channel 29 shown in FIG. 6B, the sleeve 37 having a barrier effect which prevents additional fuel from entering the defined internal region ZS. This is advantageous for preventing contamination by unfiltered fuel CB at the outlet 5, even during the short period corresponding to the lifting of the valve 22 (here under the effect of the compression spring or similar resilient return means R, as illustrated in FIG. 6B).

FIGS. 6A-6B illustrate the case of a closure member 28 mounted so as to be longitudinally movable in the base portion BP in order to selectively close a purge channel 29 connecting the inside volume V and the corresponding discharge means. More generally, there may be provided, opposite the cover 3, any suitable means for discharging the unfiltered fuel CB during a phase of replacing the filter insert 6.

As is clearly visible in FIGS. 1 and 4, the valve 22 is actuated by pushing from above, so that access to the outlet 5 is selectively enabled when the valve 22 is in a lowered position. It is arranged here that the respective raised positions of the valve 22 and closure member 28 are obtained automatically by removal of the cover 3 to which the filter insert 6 is attached.

Figure 5:
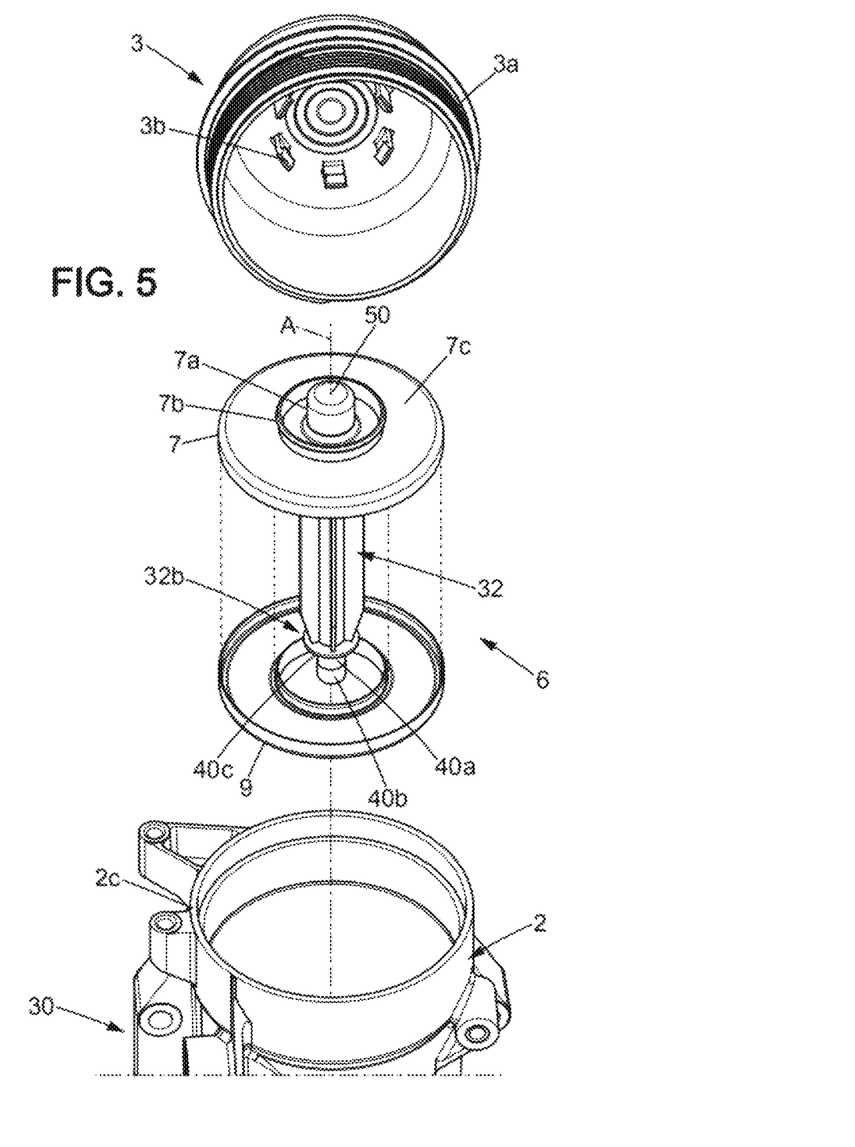
FIG. 5 is an exploded view illustrating the removable unit and the cover, ready for installation on the mounting support.

FIG. 6A illustrates these two raised positions, while FIGS. 4 and 5 show an example of tabs 3b which integrally secure the filter insert 6 to the cover 3. On the first flange 7, an annular retainer member 7b which protrudes relative to a radial portion 7c and is provided with an outwardly projecting nm, may be used to render the filter insert 6 integral with the withdrawal motion of the cover 3 without causing rotation of the filter insert 6, at least when detachment begins.

Of course, one may use any other manner of mechanically securing (detachably) the cover 3 and the first flange 7 or other structural member of the filter insert 6.

Referring to FIGS. 1 to 3, it can be seen that the valve 22 may optionally have one or at least two projections T1, T2 longitudinally projecting relative to the upper sealing face 22a, which is preferably substantially flat. The upper sealing face 22a is located below the seat defined by the transverse wall P and for example outside the internal space 15, while the engagement face 36 of the projections T1 or T2 is located entirely within the internal space 15. This allows accommodating the entire actuator within the internal space 15, with an improved protective effect (no downwardly projecting end relative to the lower axial end of the filter insert 6). This configuration is not limiting, however. It remains advantageous for the actuator to be defined by an actuating member 32, in order to optimize the functions in the fuel filter 1 without impacting the footprint.

When a degassing function is desired, the actuating member 32 comprises or may be defined by a piping member 40 which is fluidly connected to the escape channel 25 formed in the base portion BP (which is distinct from the inlet 4 and the outlet 5). The piping member 40 communicates with the escape channel 25, which extends through the defined internal region ZS, by means of the defined pipe 21.

Referring to FIGS. 1 and 4, while the actuating member 32 is integral to the first flange 7 at its first end 32a, the opposite second end 32b engages with the defined pipe 21 of the connection interface 17 when the filter insert 6 is in the mounted/operative position. The upper end of the defined pipe 21 is formed by an upper pipe segment 21a which protrudes from the upper face of the transverse wall P against which the second flange 9 can come to bear.

The first end 32a is illustrated here as slidingly fixed relative to the filter insert 6, by direct engagement against the first flange 7. In less preferable embodiments, the first end 32a can be fixed at a distance from the first flange 7 by using an additional part, for example an annular member which extends between the flanges 7 and 9 and forms a chimney with the port 50 of small cross-section (while traversing the first flange 7 with a sealed annular contact).

More generally, it is possible for the actuating member 32 to be fixedly mounted near the first flange 7, optionally being connected (detachably or non-detachably) to the cover 3, bearing in mind that the filter insert 6 is then typically integral with a withdrawing translational movement of the cover 3 relative to the mounting support 30, during a step of changing the filter insert 6.

Referring to FIGS. 5 and 6A, the second end 32b optionally comprises:
  a first contact portion 40a, which preferably forms a male portion for insertion into the defined pipe 21, in particular into the upper pipe segment 21a; and
  a second contact portion 40c, preferably offset longitudinally relative to the first contact portion 40a and adapted to abut axially against the valve 22, here on one or more engagement faces 36, in order to push it downward.

The first contact portion 40a may have an annular bead 40b which projects radially outward, thereby defining an annular sealing contact. This eliminates the risk of gases escaping into the internal space 15 at region Z2 (see FIG. 4) where the filtered fuel CT is flowing. The second contact portion 40c may be defined by a collar or a shoulder and for example abut against the edge of the upper pipe segment 21a, to stabilize the connection position of the second end 32b.

In FIG. 4, the arrows indicating the gases GC from the fuel illustrate the flow of these gases in the filter 1 during operation. The connection between the first flange 7 and the first end 32a can be achieved by tight engagement in the hollow of a chimney portion 7a defined centrally by the first flange 7. The chimney portion 7a protrudes longitudinally outward from the radial portion 7c and defines the calibrated port 50 for preventing an accumulation of air and/or other gas at a high point of the inside volume V of the filter 1.

The port 50 here is adjacent to the cover 3 and may optionally be traversed by the longitudinal axis A. This port 50 of small cross-section is located above the hollow internal space 15, here in an upper face of the chimney portion 7a. Advantageously, the port 50 of small cross-section has a diameter (or similar characteristic dimension) of between 0.1 and 1 mm.

Although the gas capturing upper end 11 here corresponds to a protruding structure (chimney portion 7a) defined by the first flange 7, it is understood that the end 11 may be made differently, for example by forming the port 50 at the upper end 32a of the piping member 40 in a variant in which it protrudes upward through the first flange 7. More generally, the gas venting means may be configured either for capturing the gases in the region Z1 upstream of the filtration (here just above the first flange 7) or for capturing the gases in the region Z2 downstream of the filtration (for example just below the first flange 7).

Due to the tight and sealing radial annular contact between the end 32a defined by the piping member 40 and the corresponding inner face of the chimney portion 7a, the fuel gases GC must necessarily flow top-down via the piping member 40 and then via the defined pipe 21 of the interface 17, to join the escape channel 25.

In the mounted state of the filter insert 6, as illustrated in FIGS. 1 and 4, the transverse wall P extends under at least one among the lower axial end of the filter insert 6 and the actuating member 32. The sleeve 37 guides the actuating member 32 during installation of the removable unit comprising the filter insert 6 and the actuating member 32.

As the mounting support 30 is adapted for venting gases in the illustrated example, the connection interface 17 and the actuating member 32 define all or part of the venting pipe for gases contained in the fuel GC. The pipe leads directly into the central pipe 20, by the lower pipe segment 21b.

Referring to FIG. 6A, it can be seen that the lower segment 21b and the passageway VP are separated by a diverting portion 21d adapted to divert a stream of gas from the upper segment 21a to the lower segment 21b. This diverting portion 21d may be radial and placed in the same general plane as the transverse wall P. This type of configuration allows the diverting portion 21d to be used as the seat portion for the valve 22, the upper segment 21a acting on the lower segment 21b can be used to guide in translation a concave outer edge 22c of the valve 22. Referring to FIG. 3, one can see that the closure part of the valve 22 has a crescent shape, enabling the concave outer edge 22c to fit snugly against a portion of the circumference of the lower segment 21b. The projections T1 and T2 may be distributed near each end of the concave outer edge 22c.

Referring to FIG. 4, it can be seen that the sleeve 37 also serves to channel the filtered fuel CF, which flows down from the top of the sleeve 37 (from the upper opening of the sleeve, formed in the internal space 15) down to the defined internal region ZS and then the outlet 5. In the case where the actuating member 32 allows degassing, the gases GC flow in the piping member 40 in parallel to the flow of filtered fuel CF in the sleeve 37.

The gas venting port 50 has for example a flow area which may be round or optionally have one or more constrictions, so as to release the air and/or other gas in the form of small bubbles. The term "small" is understood to mean bubbles having a diameter of less than 4 mm.

One advantage of the invention lies in the possibility of combining the functions present in the hollow internal space 15 defined by the filter medium 8, and to provide easy replacement of the filter insert 6, without affecting the quality of the fuel recovered at the outlet 5.

It should be obvious to those skilled in the art that the present invention allows embodiments in many other specific forms without departing from the scope of the invention as claimed. In particular, although the drawings show the case of a tubular piping member 14 for moving the valve, it is clear that such a valve may be pushed by any suitable member arranged similarly and extending in the hollow internal space 15 defined by the filter medium 8. Thus, with reference to FIG. 6A, it is understood that the lower housing which communicates with the central pipe 20 can serve as an electrical connector and the actuating member 32 is electrically and detachably connected to said connector. To achieve this, the actuating member 32 comprises two connection poles in a first contact portion which is offset from a second contact portion 40c that engages against the valve 22. Portion 21d in this case can define two terminals connected to the electrical connector and which the two connecting poles abut against.

In such a case, the actuating member 32 may provide heating or sensing functions (for example, for placing in the region Z2, preferably at the top of the region, a pressure sensor usable for determining a pressure difference and allowing detection of a blockage in comparison to a pressure detected at region Z1).

The invention claimed is:

1. A fuel filter comprising:
a receptacle comprising a base portion forming a bottom and a cover detachably connected to the base portion, the receptacle being provided with an inlet for unfiltered fuel and an outlet for filtered fuel which is located in the base portion, an inside volume being defined between the base portion and the cover,
a filter insert arranged in the inside volume and having an upper axial end including a first flange, a lower axial end, and an annular filter medium extending about a longitudinal axis between the upper axial end and the lower axial end, the annular filter medium having an inner face which defines a hollow internal space in communication with the outlet,
a central member extending in the hollow internal space, having a first end directly integral or adjacent to the first flange and a second end opposite to the first end,
a connection interface distinct from the base portion and mounted between the base portion and the filter insert, the connection interface including a transverse wall extending beneath at least one among the lower axial end and the central member, the transverse wall including a passageway for fluid communication of filtered fuel between the hollow internal space and the outlet,
wherein the transverse wall also defines a passage for conveying gases contained in the unfiltered fuel to an escape channel that is distinct from the inlet and the outlet, and
wherein the fuel filter further comprises a valve having an upper sealing face for closing the passageway from below the transverse wall, the valve enabling selectively opening the passageway in an operative configuration of the filter insert as a result of an engagement between the second end of the central member and said valve which is mounted so as to move relative to the transverse wall, the central member thereby being an actuating member for moving the valve according to a position of the filter insert, the valve by default being biased toward a position which closes the passageway.

2. The fuel filter according to claim 1, comprising:
a discharge device for the unfiltered fuel, opposite to the cover; and
a closure member that is movably mounted in the base portion so as to selectively close a connecting channel between the inside volume and the discharge device, in a position where the lower axial end of the filter insert bears against the closure member.

3. The fuel filter as recited in claim 1, wherein the valve extends inside an internal region located between the bottom and the transverse wall, the valve being movable parallel to the longitudinal axis between a raised position corresponding to the closed position and a lowered position where the passageway communicates with the outlet via the internal region, the second end of the actuating member being adapted to urge the valve.

4. The fuel filter according to claim 3, wherein the base portion comprises:
a bowl including the inlet and the outlet; and
an annular wall, which extends upwardly from the bottom and defines a sealed annular contact with a second flange of annular shape defining the lower axial end of the filter insert, the annular wall defining an outer circumference of said internal region, a resilient return member which biases the valve towards the closed position being accommodated in the internal region.

5. The fuel filter as recited in claim 1, wherein the second end of the actuating member comprises:
a first contact portion, which forms a male portion for insertion into a pipe of the connection interface, the first contact portion being annular and delimiting a passage section for downward circulation of the gases; and
a second contact portion, offset longitudinally relative to the first contact portion, adapted to abut axially against the valve and to push the valve downward.

6. The fuel filter as recited in claim 1, wherein the actuating member extends parallel to the longitudinal axis and is part of a venting path for gases contained in the fuel, the venting path comprising at least one port located at the upper axial end of the filter insert.

7. The fuel filter as recited in claim 6, wherein the actuating member comprises a piping member extending within the hollow internal space and in communication with the escape channel for gases, the escape channel being distinct from the outlet and formed in the base portion, and
wherein the piping member extends inside a sleeve that belongs to the connection interface, the sleeve and the transverse wall being included in a same single-piece element of the connection interface.

8. The fuel filter as recited in claim 6, wherein the port is defined by the first flange and communicates with an interior of the piping member.

9. The fuel filter as recited in claim 1, wherein the transverse wall is provided with a seat, the position by default of the valve to close the passageway being a raised position in which the valve is bearing against the seat,
wherein the filter insert comprises a second flange extending around a central opening so that the second flange is of annular shape, the second flange defining the lower axial end of the filter insert,
wherein the valve has at least one projection protruding longitudinally upwards from the upper sealing face, the upper sealing face extending below the seat in an open state of the valve for opening the passageway, and
wherein the projection comprises an engaging face and protrudes upwardly so that the valve is engaged by the central member through the central opening, the engaging face being adapted to be axially engaged by the central member, which is located above the seat in the open state of the valve.

10. The fuel filter as recited in claim 1, wherein the valve has:
a lower face abutting against a portion that projects relative to the bottom; and
a tubular sliding member mounted around a longitudinal guide of the base portion, the tubular sliding member extending downwardly from the lower face of the valve.

11. The fuel filter according to claim 4, wherein the annular wall is integrally formed as one piece with the bowl.

12. The fuel filter as recited in claim 4, wherein the actuating member extends parallel to the longitudinal axis and is part of a venting path for gases contained in the fuel, the venting path comprising at least one port located above the hollow internal space, each port having a diameter of between 0.1 and 1 mm.

13. The fuel filter according to claim 12, wherein the base portion supports the connection interface that is sealingly connected to the annular wall, the connection interface forming a sealing continuity between the annular wall and the second flange, so that a region upstream of the annular filter medium that communicates with the inlet is separated from a region downstream of the annular filter medium that communicates with the outlet, the annular wall surrounding all or part of a pipe included in the connection interface, the pipe forming part of the venting path.

14. The fuel filter according to claim 1, wherein the central member forms a piping member, the first flange extending between an open end of the piping member and the cover, one among the piping member and the first flange having a port provided with a diameter of between 0.1 and 1 mm, adapted for selectively circulating the gases through the piping member in a direction away from the cover.

15. A fuel filter comprising:
a receptacle comprising a base portion forming a bottom and a cover detachably connected to the base portion, the receptacle being provided with an inlet for unfiltered fuel and an outlet for filtered fuel which is located in the base portion, an inside volume being defined between the base portion and the cover,
a filter insert arranged in the inside volume and having an upper axial end including a first flange, a lower axial end, and an annular filter medium extending about a longitudinal axis between the upper axial end and the lower axial end, the annular filter medium having an inner face which defines a hollow internal space in communication with the outlet,
a central member extending in the hollow internal space, having a first end directly integral or adjacent to the first flange and a second end opposite to the first end, the central member being formed as a piping member for downward circulation of gases contained in the unfiltered fuel,
a transverse wall extending beneath at least one among the lower axial end and the central member, the transverse wall being separate from the filter insert and including a passageway for fluid communication of filtered fuel between the hollow internal space and the outlet,
wherein the transverse wall also includes a passage for conveying the gases circulated via the central member to an escape channel that is distinct from the inlet and the outlet, and
wherein the fuel filter further comprises a valve enabling selectively opening the passageway in an operative configuration of the filter insert as a result of an engagement between the second end of the central member and said valve which is mounted so as to move relative to the transverse wall that remains secured to the base portion, the central member thereby being an actuating member for engaging and moving the valve according to a position of the filter insert, the valve by default being biased toward a position which closes the passageway.

16. The fuel filter according to claim 15, wherein the transverse wall defines a seat for the valve, and
wherein a sealing radial annular contact is obtained by engagement between a lower end of the central member and a pipe of the transverse wall.

17. The fuel filter according to claim 16, wherein the pipe of the transverse wall is protruding upwardly and extends annular around the longitudinal axis, which is an axis of revolution of the filter insert.

18. The fuel filter according to claim 17, wherein the valve is mounted below the transverse wall and includes a closing portion for closing the passageway from below, the closing portion extending perpendicular to the longitudinal axis and being provided with an upper sealing face,
wherein the valve includes a tubular sliding member protruding downwardly from a lower face of the closing portion, the tubular sliding member being laterally offset relative to the pipe of the transverse wall, and
wherein a spring extends inside the tubular sliding member for biasing the valve by default toward the position which closes the passageway.

19. The fuel filter according to claim 15, wherein the filter insert comprises a second flange extending around a central opening so that the second flange is of annular shape, the second flange defining the lower axial end of the filter insert, and
wherein the central member engages a portion of the valve axially, through the central opening.

* * * * *